(12) United States Patent
Mashitani (10) Patent No.: US 10,274,739 B2
(45) Date of Patent: Apr. 30, 2019

(54) THREE-DIMENSIONAL IMAGE DISPLAY APPARATUS

(71) Applicant: Panasonic Intellectual Property Management Co., Ltd., Osaka (JP)

(72) Inventor: Ken Mashitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/008,411

(22) Filed: Jun. 14, 2018

(65) Prior Publication Data
US 2019/0011715 A1 Jan. 10, 2019

(30) Foreign Application Priority Data

Jul. 4, 2017 (JP) .................................. 2017-130905
May 14, 2018 (JP) .................................. 2018-092679

(51) Int. Cl.
G02B 27/22 (2018.01)
G02B 17/06 (2006.01)
H04N 13/302 (2018.01)
H04N 13/363 (2018.01)

(52) U.S. Cl.
CPC ......... *G02B 27/22* (2013.01); *G02B 17/0605* (2013.01); *H04N 13/302* (2018.05); *H04N 13/363* (2018.05)

(58) Field of Classification Search
CPC .............. G02B 27/2292; G02B 17/061; G02B 17/0605; G02B 27/24; G03B 21/28
See application file for complete search history.

(56) References Cited

U.S. PATENT DOCUMENTS

| 2005/0286129 | A1* | 12/2005 | Huber | A63J 5/02 359/490.02 |
| 2007/0008636 | A1* | 1/2007 | Cuo | G02B 17/061 359/857 |
| 2010/0231694 | A1 | 9/2010 | Kawamura | |
| 2015/0062294 | A1* | 3/2015 | Sibley | G03H 1/0005 348/43 |

FOREIGN PATENT DOCUMENTS

| JP | 2002-333598 | 11/2002 |
| JP | 2009-049007 | 3/2009 |
| JP | 2013-118596 | 6/2013 |
| JP | 2015-172607 | 10/2015 |

* cited by examiner

*Primary Examiner* — Ryan D Howard
(74) *Attorney, Agent, or Firm* — Wenderoth, Lind & Ponack, L.L.P (57) ABSTRACT

The three-dimensional image display apparatus includes the following structural elements:
- an optical system including a concave mirror, and a light transmitting section provided to the concave mirror at a boundary between a first space and a second space, the optical system forming a real image in the second space, with an aid of the concave mirror, of an object disposed in the first space available on the concave mirror; and
- an image output device disposed at a place so as not to substantially block an optical path of light rays forming the real image of the object.

11 Claims, 7 Drawing Sheets

THREE-DIMENSIONAL IMAGE DISPLAY APPARATUS

BACKGROUND

1. Technical Field

The present disclosure relates to three-dimensional image display apparatuses.

2. Description of Related Art

Two sheets of concave mirrors are placed in a vertically face-to-face manner. A first concave mirror includes an opening on the top face, so that a real image of an object placed on the bottom face of a second concave mirror appears above the opening. This optical system is referred to as 'bol-matrix' (e.g. disclosed in Patent Literature 1 (Unexamined Japanese Patent Application Publication No. 2015-172607), in which illumination light is casted to an object).

SUMMARY

A conventional technique indeed allows the real image of the object placed on the bottom face to appear, nevertheless, the conventional technique cannot vary the actual image. For instance, a color or a pattern of the object can be changed on the real image only if the object per se is replaced. Not to mention, these looks cannot be changed interactively in response to situations outside.

The present disclosure provides a three-dimensional image display apparatus that allows varying looks of the real image with an image output device installed at a place so as not to block an optical path of light rays forming an image.

The three-dimensional image display apparatus in accordance with a first aspect of the present disclosure includes the following structural elements:

- an optical system including a concave mirror, and a light transmitting section provided to the concave mirror at a boundary between a first space and a second space, the optical system forming a real image in the second space, with an aid of the concave mirror, of an object disposed in the first space available on the concave mirror; and
- an image output device disposed at a place so as not to substantially block an optical path of light rays forming the real image of the object.

A three-dimensional image display apparatus in accordance with a second aspect of the present disclosure comprises the following structural elements:

- an optical system including a first concave mirror, and a second concave mirror having a light transmitting section, and disposed so as for a reflective surface of the second concave mirror to confront a reflective surface of the first concave mirror; and
- an image output device disposed around a connecting section connecting the first concave mirror and the second concave mirror.

The light transmitting section is placed at a boundary between a first space available inside the second concave mirror and a second space available outside the second concave mirror, the optical system forming in the second space a real image of the object placed on a bottom face of the first concave mirror disposed in the first space.

The image output device is disposed at a place so as not to block the light path of the light rays forming the image.

This structure allows the three-dimensional image display apparatus to vary looks of the real image of the object.

DETAILED DESCRIPTION

The exemplary embodiments of the present disclosure are demonstrated hereinafter with reference to the accompanying drawings. Descriptions more than necessary will be omitted. For instance, well-known matters will not be detailed, or substantially the same structures will not be described repeatedly. These omissions will avoid redundant descriptions and help the skilled persons in the art understand the present disclosure with ease.

The applicants of the present disclosure provide the accompanying drawings and the description below for the skilled persons in the art to fully understand the present disclosure. These materials will not limit the scope of the claims.

First Exemplary Embodiment

Figure 1:
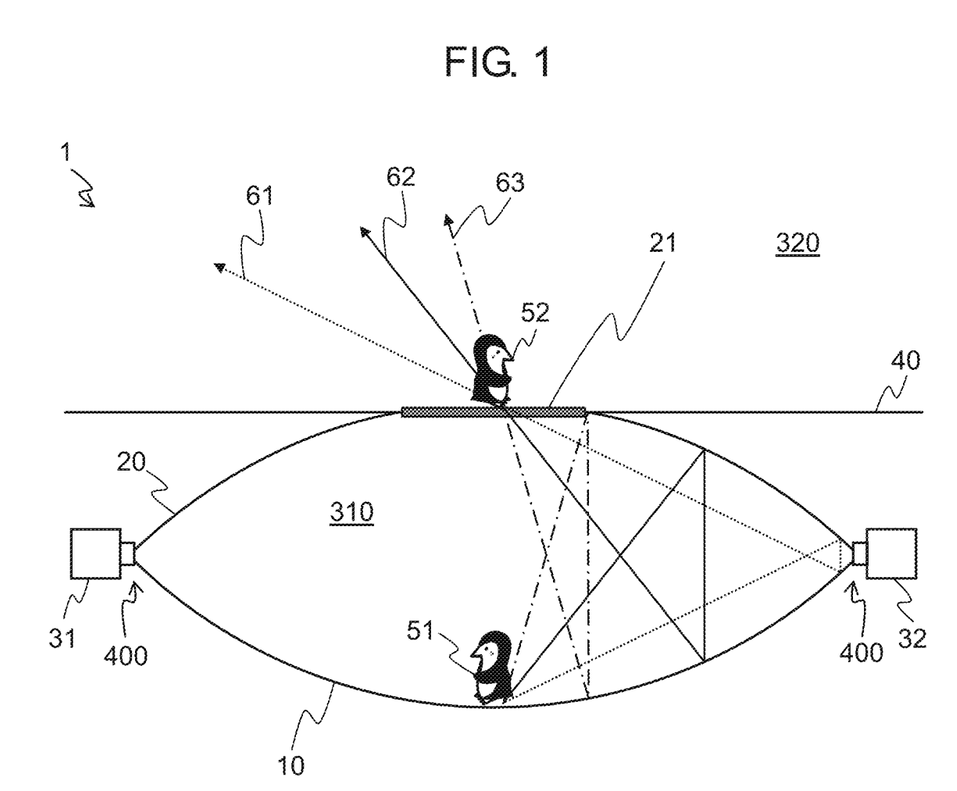
FIG. 1 shows a three-dimensional image display apparatus in accordance with a first embodiment of the present disclosure.

The structure of the three-dimensional image display apparatus in accordance with the first embodiment is demonstrated hereinafter with reference to FIG. 1.

Three-dimensional image display apparatus 1 in accordance with the first embodiment includes first concave mirror 10 and second concave mirror 20. First concave mirror 10 is connected to second concave mirror 20 such that the inside face (concave face) of first concave mirror 10 confronts the inside face (concave face) of second concave mirror 20. These inside faces are reflective faces (i.e. mirror surface). Second concave mirror 20 includes opening 21 at the center thereof. Opening 21 has a size equal to that of an opening formed on the ground or table surface 40. Opening 21 and this opening formed on the ground or table surface 40 are placed on top of each other. Opening 21 is an example of light transmitting section.

The foregoing structure separates a space into two parts with opening 21 as a border, namely, first space 310 inside second concave mirror 20 and second space 320 outside second concave mirror 20.

Object 51 is disposed at the center section of the bottom face of first concave mirror 10. Incident light from opening 21 strikes object 51 and diffuses. This diffusing light is condensed outside opening 21 with the aid of first and second concave mirrors 10 and 20. FIG. 1 shows that light ray 61 (broken line with arrow), light ray 62 (solid line with arrow), and light ray 63 (dash-dot line with arrow), where these three rays emit from a bottom edge point of object 51, are condensed above opening 21. Light rays emitting from other points of object 51 are also condensed alike. As a result, real image 52 of object 51 is formed in second space 320 outside opening 21. As discussed previously, first concave mirror 10 and second concave mirror 20 having opening 21 are disposed such that the reflective faces thereof confront each other, thereby forming an optical system. This optical system allows producing real image 52 of object 51, placed in first space 310 inside the concave mirrors, in second space 320 outside the concave mirrors, where opening 21 works as the border between first space 310 and second space 320.

Figure 2:
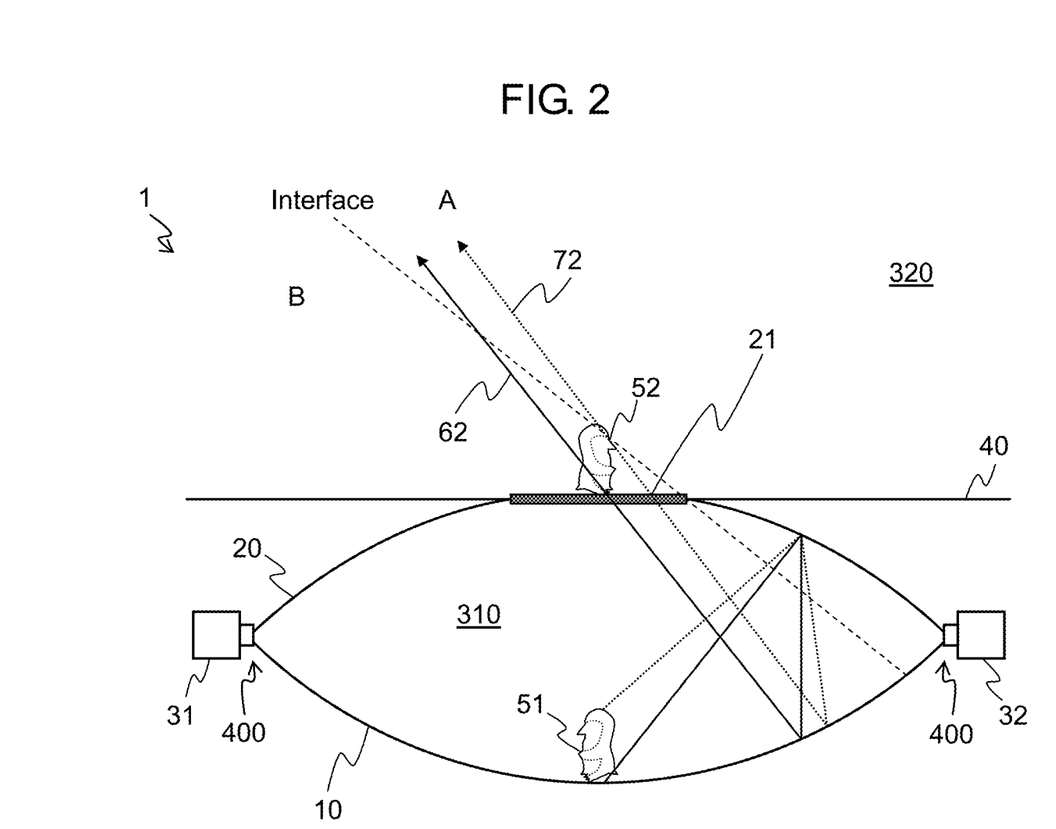
FIG. 2 schematically illustrates how the three-dimensional image display apparatus shown in FIG. 1 displays a real image.

FIG. 2 shows typical light ray 72 (broken line with arrow) emitting from a top edge of object 51 and typical light ray 62 (solid line with arrow) emitting from a bottom edge of object 51. An observation at a position, from which the light rays emitting from the top edge across the bottom edge of object 51 are viewable, allows an observer to view real image 52 of entire object 51. For instance, an observation at position A in FIG. 2 allows the observer to view real image 52 of entire object 51.

On the other hand, an observation at point B shown in FIG. 2 does not allow the observer to view real image 52 of entire object 51. To be more specific, the observer positioned below an interface (broken line) extending from the edge of opening 21 and the top edge of real image 52 of object 51 cannot view real image 52 of the entire object 51. In other words, the light rays traveling near the connecting section (connecting section 400) between first concave mirror 10 and second concave mirror 20 are not used.

Figure 3:
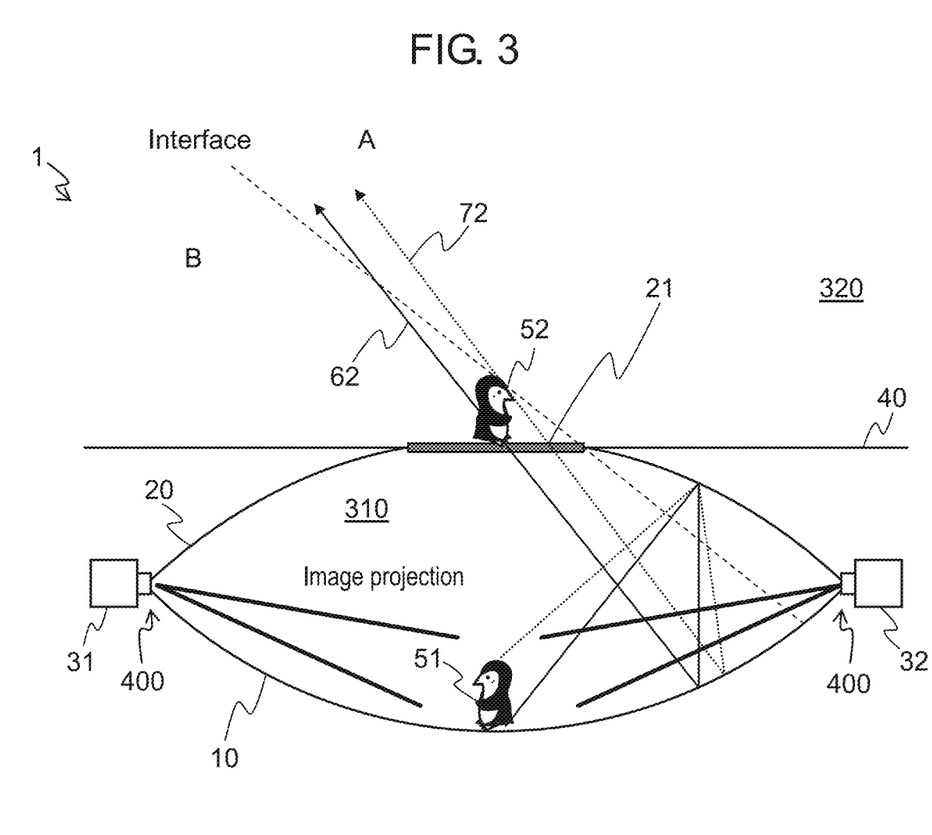
FIG. 3 shows a projection by a projector of the three-dimensional image display apparatus shown in FIG. 1.

A projector is thus installed near this connecting section 400. As FIGS. 1, 2, and 3 show, first projector 31 and second projector 32 are installed at places such that these projectors do not block the light path of the light rays that form real image 52 of object 51. As FIG. 3 shows, first projector 31 and second projector 32 project images onto object 51. The image light rays projected onto object 51 diffuse and reflect, and as the light rays emitting from object 51 do, the projected light rays reflect from first concave mirror 10 as well as from second concave mirror 20, and then form an image in second space 320 outside opening 21.

Variations in the image light rays supplied from first projector 31 and second projector 32 will allow changing colors or patterns on object 51. An image of a face is projected on object 51, and then an expression of the face can be changed. Suppose an image is projected onto object 51, object 51 can be in a mono color, white, or a light color to be ready for receiving the image projection.

First projector 31 and second projector 32 desirably project an image only onto object 51. If they project an image onto regions other than object 51, reflections are repeated inside first space 310 and light rays probably emit from opening 21 along undesirable directions.

Figure 4:
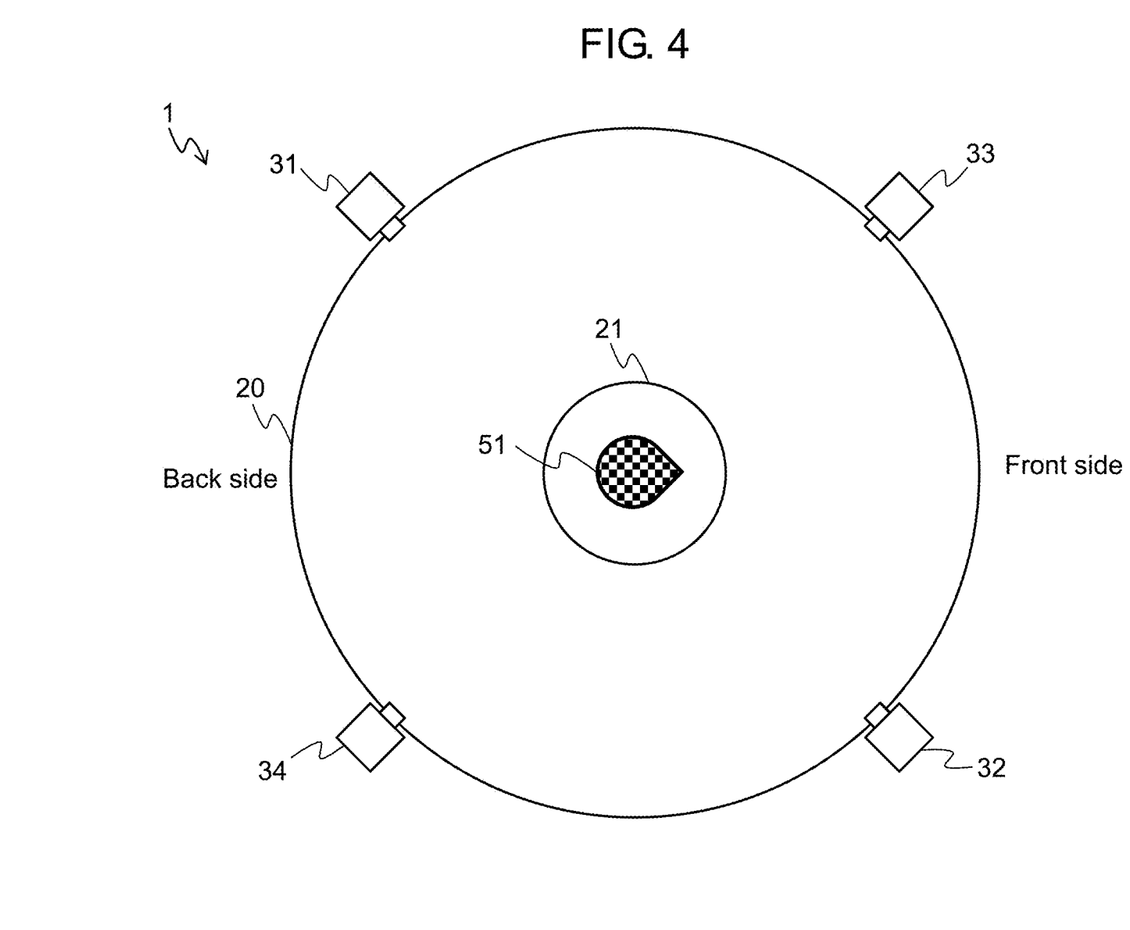
FIG. 4 shows locations of the projectors of the three-dimensional image display apparatus shown in FIG. 1.

In the case of object 51 having an orientation like a doll (front-back distinguishable), an image is projected desirably onto the doll along the directions other than toward the front of object 51, because light rays leaking from the projectors can be viewed around the front of object 51 when the observation is done at position B shown in FIG. 3. To overcome this problem, the projectors are disposed as shown in FIG. 4, namely, the projectors are placed such that they project an image along the directions other than toward the front of object 51. Then the leakage light rays are hard to view around the front of object 51. In FIG. 4, four projectors are exemplarily placed such that a straight line from the front of object 51 runs between second projector 32 and third projector 33. In other words, first projector 31, second projector 32, third projector 33, and fourth projector 34 are placed at the positions other than the front side of object 51.

In the example shown in FIG. 4, four projectors are placed around connecting section 400 of three-dimensional image display apparatus 1, and yet, they are placed equidistantly along the circumference; nevertheless, they are not necessarily placed equidistantly. For instance, in the case of an image projection onto the front side of object 51 being emphasized, a distance between second projector 32 and third projector 33, both nearer to the front side of object 51 than the other projectors, can be set shorter than distances between other projectors. The number of projectors to be placed is not always four, and the number can be anyone (e.g. 1-3, or greater than 5). Each of these four projectors 31-34 is an example of the image output device.

A transparent glass sheet, or a transparent resin sheet can be placed at opening 21 as a light transmitting member for separating the space, formed by first concave mirror 10 and second concave mirror 20, into an inside space (first space) and an outside space (second space). This structure prevents external dust or foreign matters from entering the inside space.

The light transmitting member to be placed at opening 21 can be made of strengthened glass or reinforced plastic. In this case, if a heavy object such as a human body is placed thereon or an impact hits thereon, the light transmitting member is not broken.

A diffusion-type liquid crystal panel can be placed at opening 21, and it works as a diffusion panel when a voltage is not applied thereto, however, it becomes transparent when a voltage is applied thereto. In a diffusing state with no voltage application, light is diffused, so that an image cannot be formed, and a real image of an object cannot be viewed. When a voltage is applied thereto, the panel becomes transparent, so that light rays can form an image. A real image thus appears from opening 21 into outside second space 320. A liquid crystal panel switchable between a light-transmission mode and a light-shielding mode can be used instead of the diffusion-type liquid crystal panel. The appearance and disappearance of a real image thus can be controlled by using an optical element switchable between a light-transmission mode and a light-diffusion mode or an optical element switchable between a light-transmission mode and a light-shielding mode.

First Modification

Figure 5:
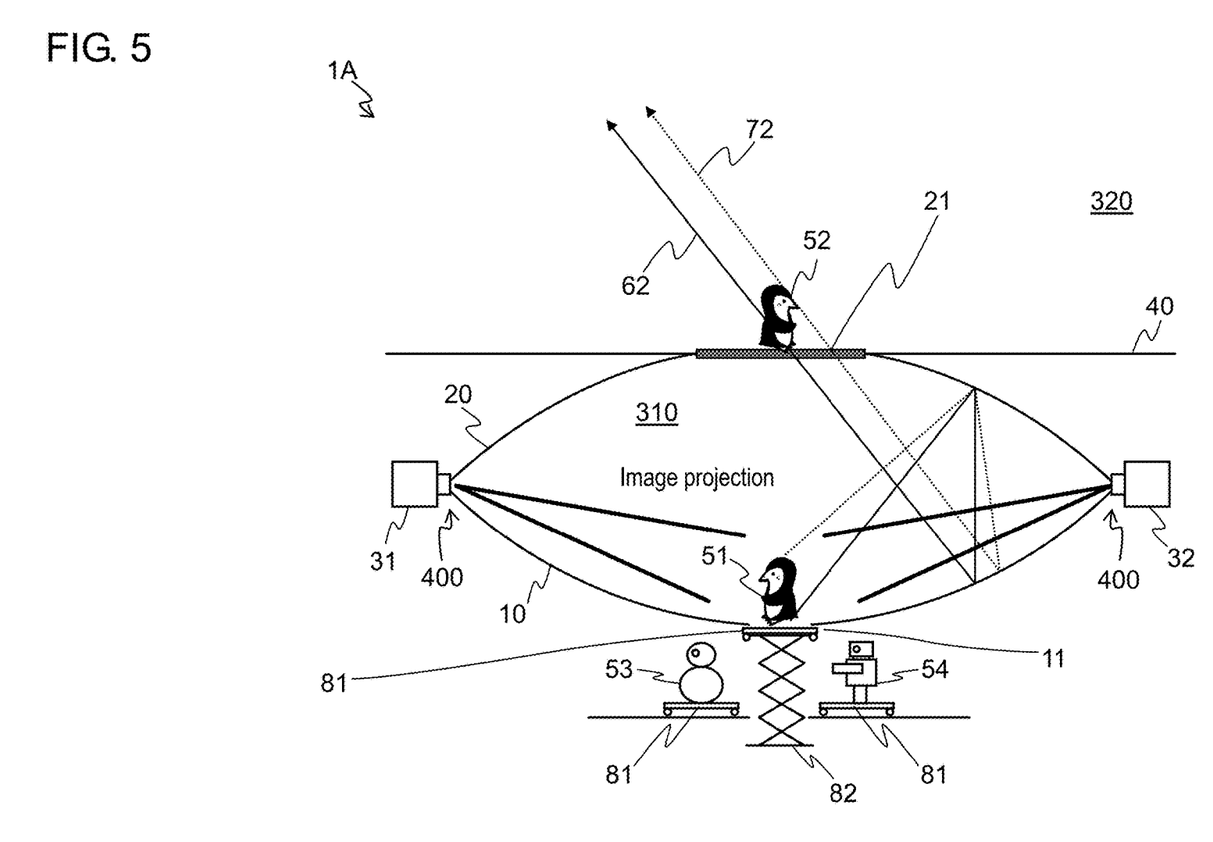
FIG. 5 shows a three-dimensional image display apparatus in accordance with a first modification of the first embodiment.

FIG. 5 illustrates a first modification of the first embodiment. Three-dimensional image display apparatus 1A in accordance with this first modification employs an object replacement mechanism disposed on the bottom face of first concave mirror 10. As FIG. 5 shows, multiple objects 51, 53, 54 placed on carts 81 move on a rail, and a selected object is lifted by lift 82. This system discussed above allows replacing the object with another one. In this case, opening 11 is formed at the center section of the bottom face of first concave mirror 10. During the replacement of the object, the voltage of the diffusion-type liquid crystal panel is turned off, so that the liquid crystal panel turns to the diffusion state, which prevents the replacement of the object from being viewed.

The object is taken out from first space 310 by lift 82, and then a part of the object can be changed. The object having undergone this change is returned into first space 310 through opening 11 of first concave mirror 10. The object thus can be changed through the process discussed above.

Second Modification

Figure 6:
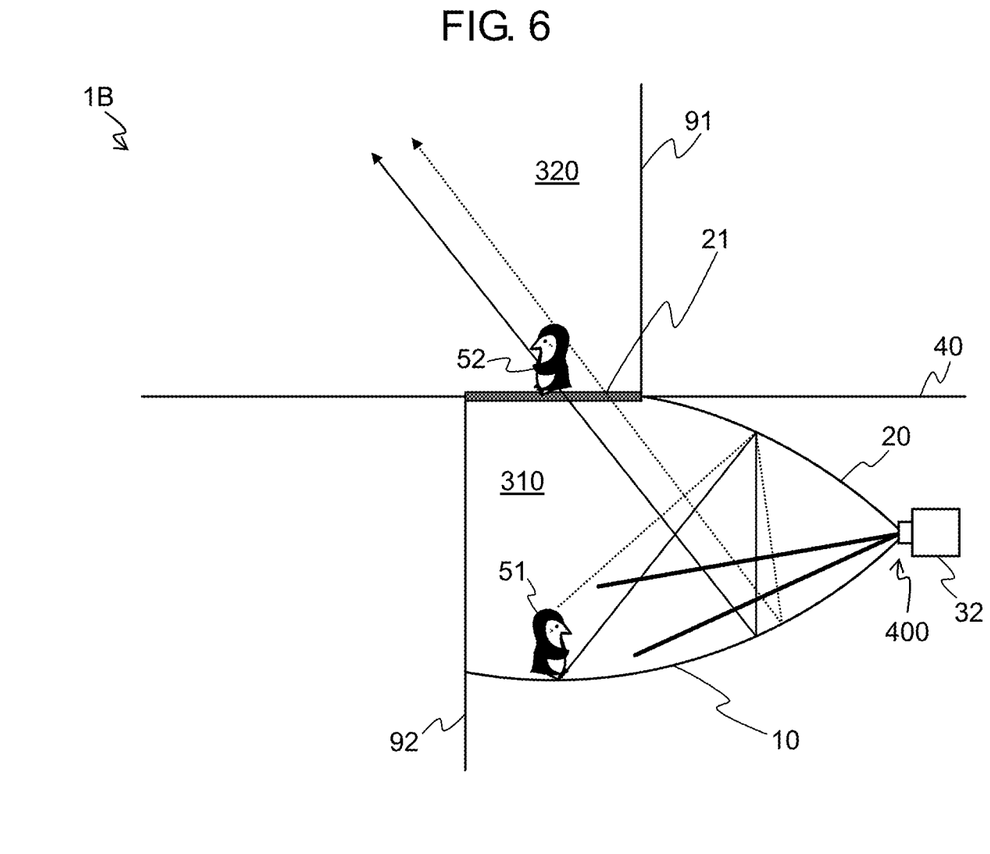
FIG. 6 shows a three-dimensional image display apparatus in accordance with a second modification of the first embodiment.

FIG. 6 illustrates the second modification of the first embodiment. Three-dimensional image display apparatus 1B in accordance with the second modification uses only parts of first concave mirror 10 and second concave mirror 20 as shown in FIG. 6. In this case, since no image light is projected from behind object 51, the backside of real image 52 cannot be observed. Wall 91 is provided so that real image 52 cannot be viewed from the backside. As FIG. 6 shows, it is desirable for the left halves of first concave mirror 10 and second concave mirror 20 to be buried in wall 92. In other words, the concave mirrors 10 and 20 on the backside of object 51 are desirably buried in wall 92.

FIG. 6 shows an instance where second projector 32 of three-dimensional image display apparatus 1B projects image light onto object 51. In the case of avoiding a projection from the front side of object 51, first projector 31 and fourth projector 34 (shown in FIG. 4) are not used, but second projector 32 and third projector 33 are placed such that the front side of object 51 orients toward between second projector 32 and third projector 33, both of which then project image light onto object 51. Here is another way: second projector 32 is placed in front of the object 51, third projector 33 and fourth projector 34 are placed on each side of object 51, and then these three projectors project the image light onto object 51.

Second Exemplary Embodiment

Figure 7:
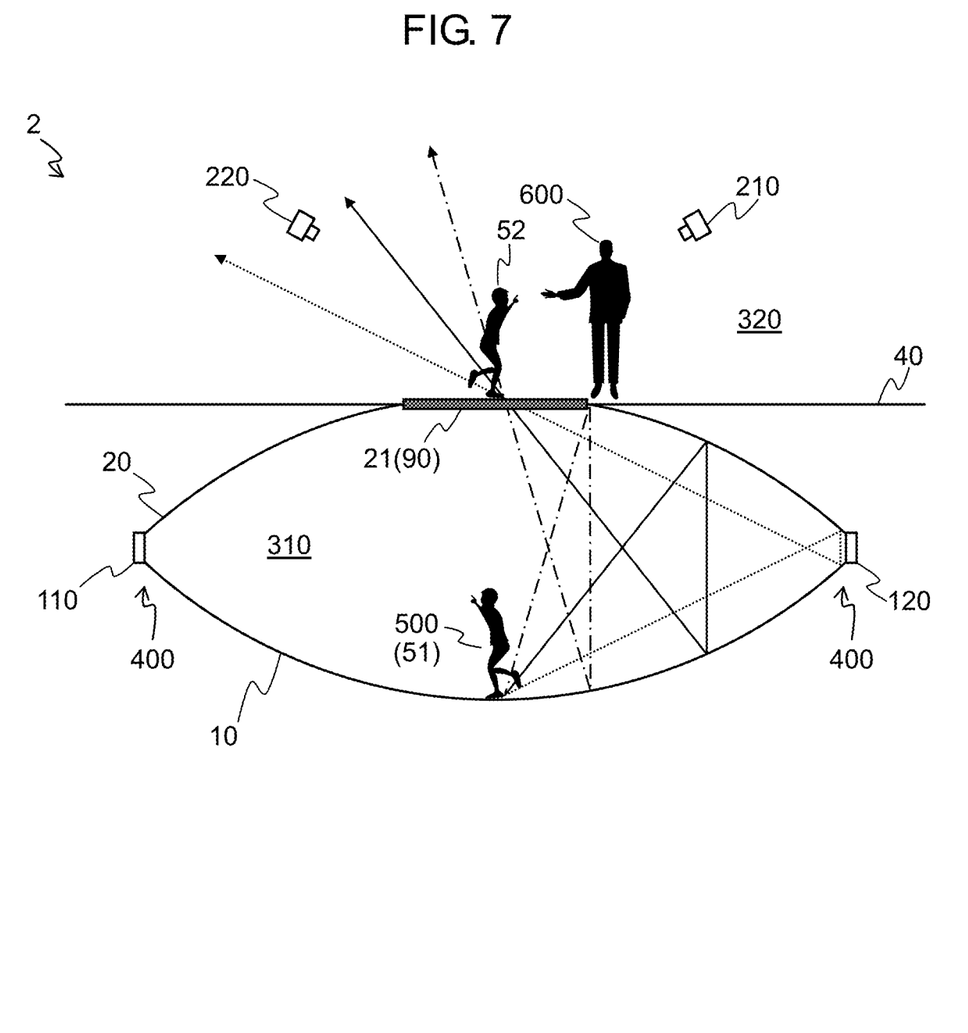
FIG. 7 shows a three-dimensional image display apparatus in accordance with a second embodiment of the present disclosure.

The second embodiment of the present disclosure is demonstrated hereinafter with reference to FIG. 7, in which similar structural elements to those in the first embodiment have the same reference marks.

Three-dimensional image display apparatus 2 in accordance with the second embodiment employs a display (e.g. liquid crystal display) disposed around a connecting section (connecting section 400) between first concave mirror 10 and second concave mirror 20. In this second embodiment, first display 110 and second display 120 are used. These two displays are placed so as not to substantially block the light path of the light rays forming real image 52 of object 51. In second space 320, first camera 210 and second camera 220 are placed for shooting this second space 320. The images shot by these two cameras are displayed on first display 110 and second display 120, which are examples of the image output device.

In first space 310, object 51 (in this case, performer 500) is disposed on the bottom section of first concave mirror 10, and performer 500 acts interactively by grasping an external situation (in second space 320) through first display 110 and second display 120. Real image 52 of performer 500 is formed in second space 320 above opening 21 with the aid of first concave mirror 10 and second concave mirror 20. This is the same mechanism as discussed in the first embodiment. Strengthened glass sheet 90, which is tough enough to bear a weight of person 600, is placed at opening 21. Assume that person 600 approaches real image 52, then performer 500 suddenly moves and frightens person 600. Likewise, performer 500 can act in response to a situation in second space 320 through real image 52.

In this second embodiment, the image signal shot and generated by first camera 210 is sent to first display 110, and the image is displayed on first display 110. In a similar way, the image shot by second camera 220 is displayed on second display 120. In the example shown in FIG. 7, performer 500 can view the image of person 600, shot by first camera 210, on first display 110, so that performer 500 can react to the action of person 600. The number of cameras and displays are not limited to two of each, and the number can be one, or equal to three or more than three. First display 110 can display both of images, shot by first camera 210 and second camera 220, in a split manner. Images shot by multiple cameras thus can be displayed on one split screen.

Other Embodiments

The embodiments discussed previously exemplify techniques disclosed in the present application; nevertheless, the techniques disclosed in this disclosure are not limited to the embodiments, and are applicable to embodiments in which alterations, substitutions, additions, or deletions are carried out. Each of the structural elements described in the previous embodiments can be combined with each other, thereby creating a new embodiment.

INDUSTRIAL APPLICABILITY

The present disclosure is applicable to three-dimensional image display apparatuses.

What is claimed is:

1. A three-dimensional image display apparatus comprising:
   an optical system including:
      a concave mirror; and
      a light transmitting section provided to the concave mirror at a boundary between a first space and a second space, the optical system forming a real image in the second space, with an aid of the concave mirror, of an object disposed in the first space available on the concave mirror;
   an image output device positioned so as not to substantially block an optical path of light rays forming the real image of the object; and
   an optical element switchable between a light-transmission mode and a light-diffusion mode or an optical element switchable between a light-transmission mode and a light-shielding mode is disposed at the light transmitting section.

2. The three-dimensional image display apparatus according to claim 1, wherein the image output device is a projector projecting an image on the object disposed in the first space.

3. The three-dimensional image display apparatus according to claim 1, wherein the image output device is a display displaying an image shot by a camera shooting the second space.

4. The three-dimensional image display apparatus according to claim 1, wherein a light transmitting member is disposed at the light transmitting section.

5. The three-dimensional image display apparatus according to claim 1, further comprising an object replacement mechanism that changes the object to be disposed in the first space.

6. A three-dimensional image display apparatus comprising:
   an optical system including:
      a first concave mirror; and
      a second concave mirror having a light transmitting section, and disposed so that a reflective surface of the second concave mirror confronts a reflective surface of the first concave mirror, the light transmitting section being placed at a boundary between a first space available inside the second concave mirror and a second space available outside the second concave mirror, the optical system forming in the second space a real image of an object placed on a bottom face of the first concave mirror disposed in the first space;

an image output device disposed around a connecting section connecting the first concave mirror and the second concave mirror; and an optical element switchable between a light-transmission mode and a light-diffusion mode or an optical element switchable between a light-transmission mode and a light-shielding mode is disposed at the light transmitting section.

7. The three-dimensional image display apparatus according to claim 6, wherein the image output device is a projector projecting an image on the object disposed in the first space.

8. The three-dimensional image display apparatus according to claim 6, wherein the image output device is a display displaying an image shot by a camera shooting the second space.

9. The three-dimensional image display apparatus according to claim 6, wherein a light transmitting member is disposed at the light transmitting section.

10. The three-dimensional image display apparatus according to claim 6, further comprising an object replacement mechanism that changes the object to be disposed in the first space.

11. A three-dimensional image display apparatus comprising:

an optical system including:

a concave mirror; and a light transmitting section provided to the concave mirror at a boundary between a first space and a second space, the optical system forming a real image in the second space, with an aid of the concave mirror, of an object disposed in the first space available on the concave mirror; and an optical element switchable between a light-transmission mode and a light-diffusion mode or an optical element switchable between a light-transmission mode and a light-shielding mode is disposed at the light transmitting section.

* * * * *